FIG. 2

Feb. 2, 1971   R. A. PATTON, JR   3,559,249
PLASTIC-MOLDING APPARATUS
Filed June 8, 1967   6 Sheets-Sheet 3

INVENTOR.
Roy A. Patton, Jr
BY Hood, Gust & Irish
Attorneys

Feb. 2, 1971  R. A. PATTON, JR  3,559,249

PLASTIC-MOLDING APPARATUS

Filed June 8, 1967  6 Sheets-Sheet 6

Inventor:
Roy A. Patton, Jr.
by Hood, Gust & Irish
Attorneys

United States Patent Office 3,559,249
Patented Feb. 2, 1971

3,559,249
PLASTIC-MOLDING APPARATUS
Roy A. Patton, Jr., Grabill, Ind., assignor to Hood,
Gust, Irish & Lundy, Fort Wayne, Ind.
Filed June 8, 1967, Ser. No. 644,573
Int. Cl. B29f 1/00
U.S. Cl. 18—42                                6 Claims

ABSTRACT OF THE DISCLOSURE

The molding apparatus of this invention includes a die having a mold cavity, the die including two mold sections selectively movable into and out of closing engagement, these mold sections having parting surfaces which are sealingly engageable with each other, the mold cavity being defined by two mating cavity portions in the parting surfaces, respectively, the cavity having opposite ends, one end being in one cavity portion and the other end being in the other cavity portion, a circular gate provided in the parting surfaces, which encircles the cavity, and an annular sprue also provided in the parting surfaces, which encircles the cavity, the sprue being radially positioned between the gate in the cavity and located approximately midway between the opposite ends of the cavity.

FIELD OF THE INVENTION

The field of the present invention involves the molding of plastic articles and more particularly to the precision molding of plastic articles provided with a multiplicity of critically located bores or passages. This field would also comprehend both injection and transfer molding as well as the use of various types of plastics having different shrinkage ratios.

DESCRIPTION OF THE PRIOR ART

In conventional molding machines, a mold cavity is formed between a pair of closed mold sections. In the usual instance, one of these sections is stationary and the other is movable into and out of engagement therewith. These mold sections are provided with engageable parting surfaces, with the cavity being formed by separated surface portions in the parting surfaces when the mold sections are engaged. In parts being molded, it is often necessary that the same be provided with a series of bores or apertures, one convenient means for providing these being the use of core pins rigidly secured to one of the die sections and removably fitted into socket portions in the other die section when the mold is closed. The core pins thereby project through the space in the cavity such that when molten material is flowed into the cavity it will form around the pins.

Various arrangements have been used in the past for securing the core pins to the die sections; however, they have all suffered from the same deficiency in that after a period of use, the core pins became worn, at least where they project into the sockets in the other die section, such that during the molding process the core pins are permitted to move slightly, thereby altering the position of the bores or passages in the finished mold part. Also, if the core pins are slightly out of alignment with the receiving sockets and do not enter properly the same, upon closure of the die sections, they will be bent or broken. Other disadvantages well known in the art result from this particular method of mounting the core pins.

Also, in prior art apparatuses, it is usually necessary to limit to a particular molding apparatus a single plastic material or different plastic materials having the same shrinkage ratio. Since all plastics shrink to a certain extent upon hardening, some more than others, it is necessary to allow for this shrinkage in order to obtain desired finished dimensions. Thus, once a mold apparatus has been constructed, its usage is usually limited to a single plastic material. In many instances, it is desirable to form the same molded articles from different plastics to serve different purposes. Using prior art constructions, it would be necessary to have a different molding apparatus for each different plastic material.

SUMMARY OF THE INVENTION

The present invention relates to an improvement in plastic-molding apparatuses in which bores or passages in the molded articles can be made with precision and the other dimensions of the article may be held to close tolerances even though plastic materials having different shrinkage ratios may be used. More specifically, the present invention relates to apparatus for the molding of connector bodies as disclosed in Roy A. Patton, Jr. application Ser. No. 611,599, filed Jan. 25, 1967, and entitled "Electrical Connector," now Pat. No. 3,497,866. Such plastic bodies are generally cylindrical and are provided with a series of coaxially arranged, parallel extending passages which are adapted removably to receive metallic connector pins which can be mated with connector pins in companion body parts. By locating the passages with precision, connecting pins in the male and female body parts can be made to engage reliably and properly for establishing reliable electrical continuity.

In the present invention, core-pin assemblies are secured in opposite cavity portions in a two-part die, each pin assembly including two pin elements engageable in end-to-end relation, the pin elements being secured at the respective ends to the respective cavity portions. Means are provided to prevent the engaged ends of the pin elements from moving laterally with respect to each other, thereby providing a substantially rigid core-pin assembly.

Also provided in this invention is a ring-gating concept which, in the main, permits a mold construction capable of being used in connection with different plastics having widely different shrinkage ratios. This concept involves the usage of a ringshaped gate coaxially surrounding the mold cavity and an annular sprue which connects the ring gate to the cavity. Thus, molten material may flow into the cavity radially inwardly around the entire periphery thereof, permitting the entire cavity to be filled and maintained filled until the material has fully hardened. Thus, even though different plastics having different shrinkage ratios are used, this concept permits maintaining the cavity filled, such that the finished part will have substantially the identical dimensions of the cavity.

It is therefore an object of this invention to provide improvements in mold apparatus whereby bores or passages may be formed in plastic parts with precision, which may be easily and reliably duplicated from one molding operation to another.

It is another object of this invention to provide an apparatus whereby parts may be molded from plastics having different shrinkage ratios and still be of essentially the same dimensions even though the same molding apparatus is used.

It is still another object to provide an apparatus for molding miniature and microminiature articles with extreme preciseness as dictated by industry requirements.

Other objects will become apparent as the description proceeds.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figures 7, 12:
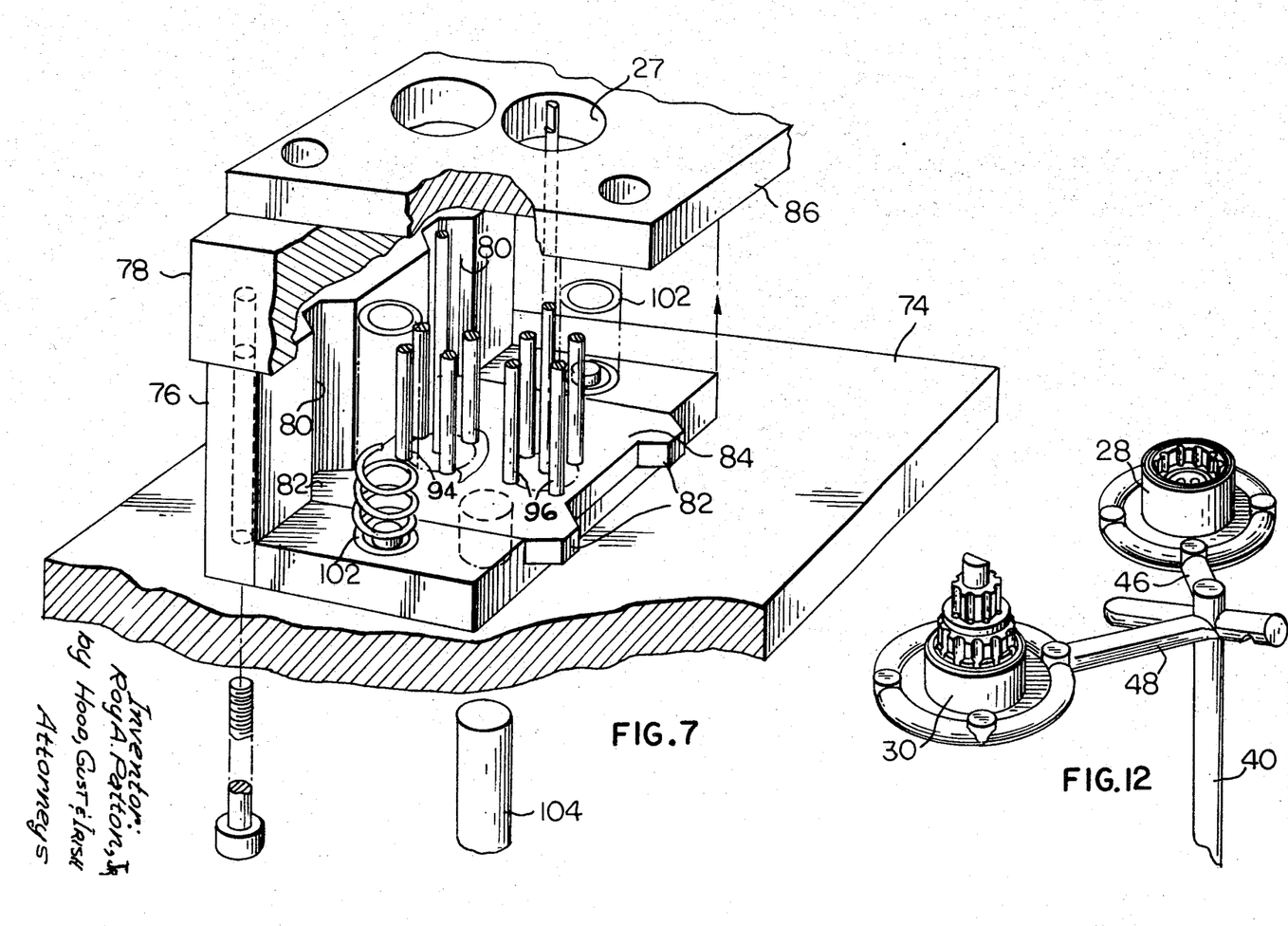
FIG. 7 is a fragmentary, perspective view of the bottom mold section shown in FIGS. 1, 2 and 3.
FIG. 12 is a perspective view of one of the finished plastic parts taken from the apparatus of FIGS. 1 and 2.

Referring to the drawings, and more particularly to FIGS. 1 through 7, a molding apparatus provided with a mold cavity which produces the part of FIG. 12 is composed generally of two mold sections, an upper section 10 and a lower section 12. The lower section 12, in the illustrated embodiment, is stationary, and the upper mold section 10 is movable vertically. These mold sections have parting surfaces 14 and 16, respectively, which, when closed, define a cavity 18 corresponding to the female connector part shown in FIG. 12, a part of the cavity indicated by the numeral 20 being formed in the upper section 10 and an opposite part 22 of the cavity being provided in the lower section 12. Actually, the cavity portions 20 and 22 are formed in inserts 24 and 26, respectively, as shown in enlarged detail in FIG. 9, these mold inserts being removably secured to the respective mold sections 10 and 12.

Figure 1:
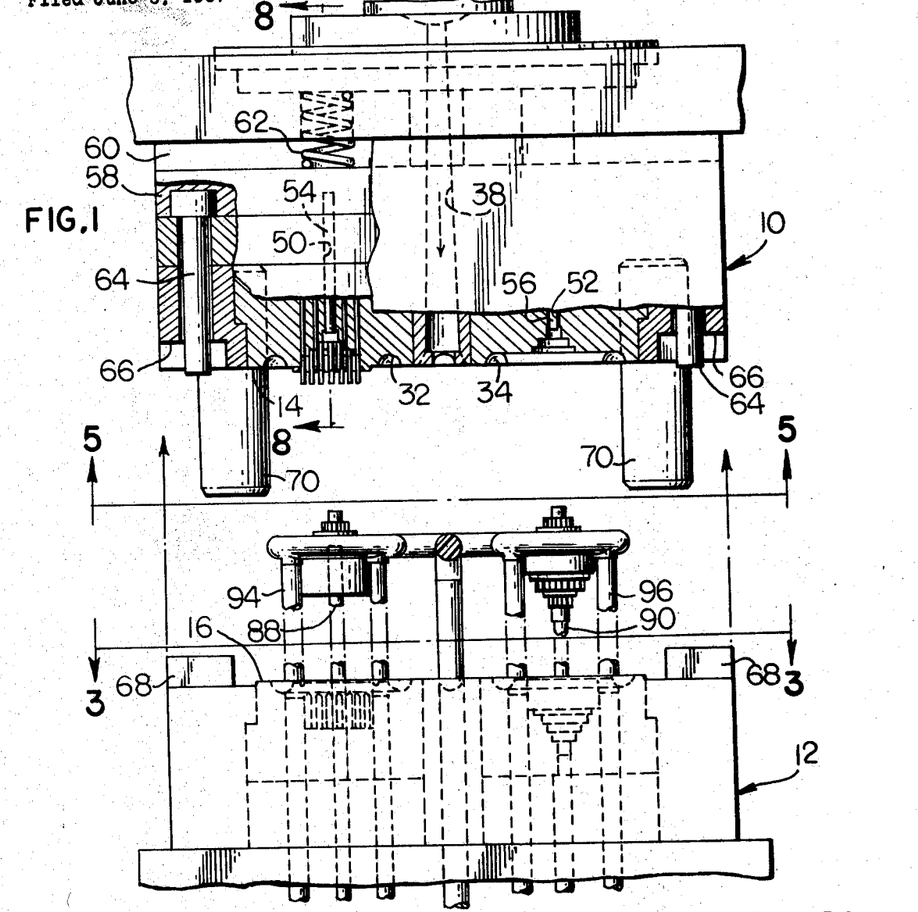
FIG. 1 is a side view, partially sectioned for clarity, of one molding apparatus of this invention in which the two mold sections are separated for withdrawing a molded article therefrom.
Figure 2:
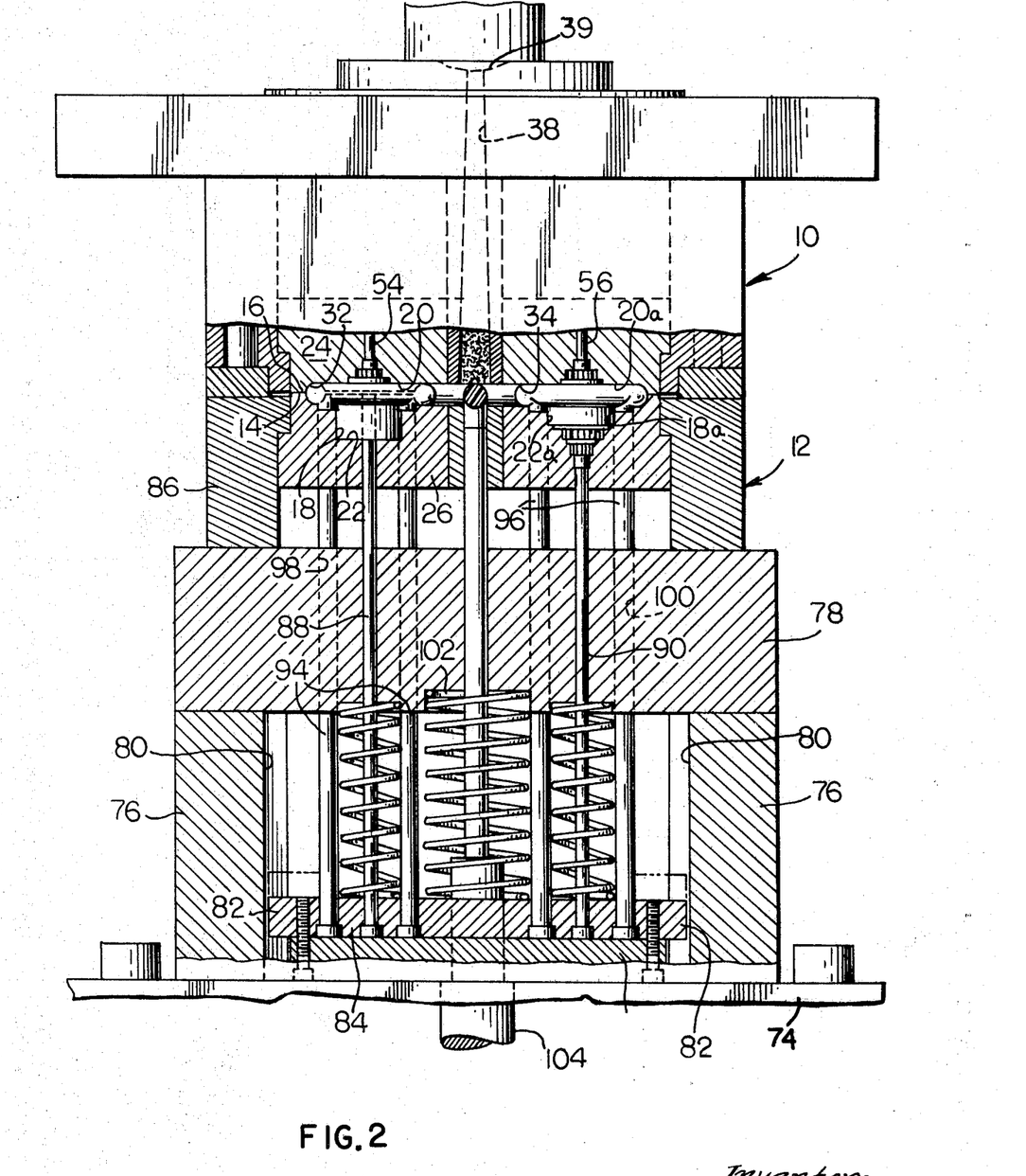
FIG. 2 is a similar view, partially sectioned for clarity of illustration, of the mold sections closed and the plastic article being formed therein.
Figure 3:
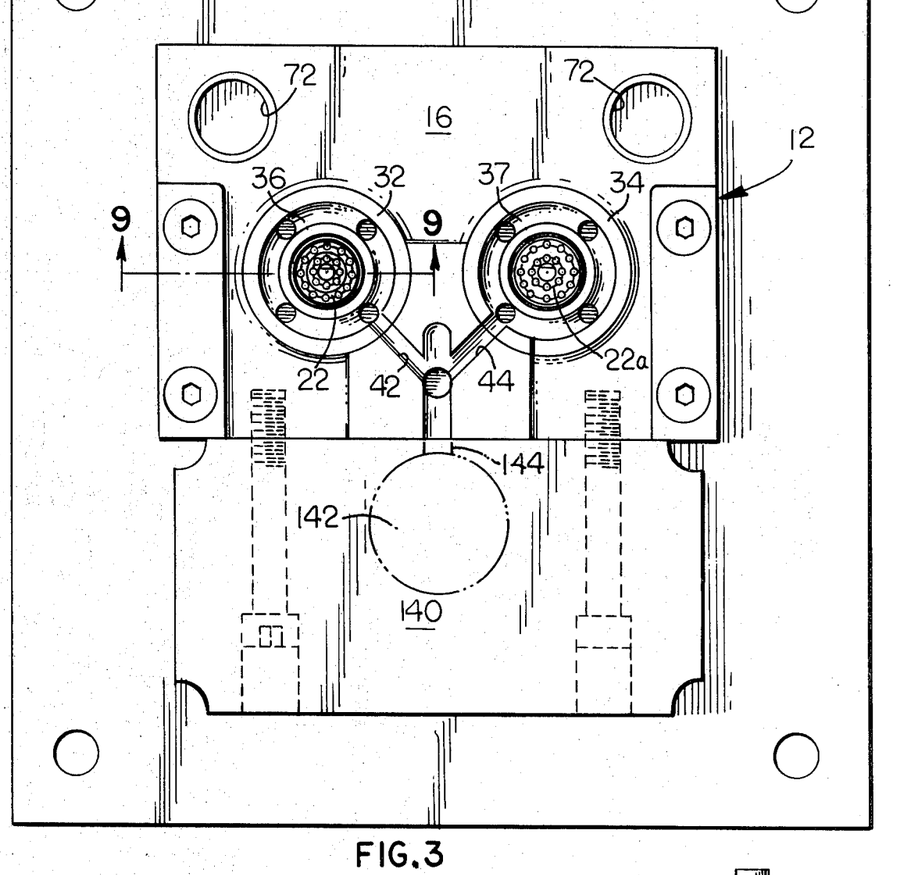
FIG. 3 is a top plan view of the lower mold section as shown in the preceding FIGS. 1 and 2.
Figures 4, 14, 15:
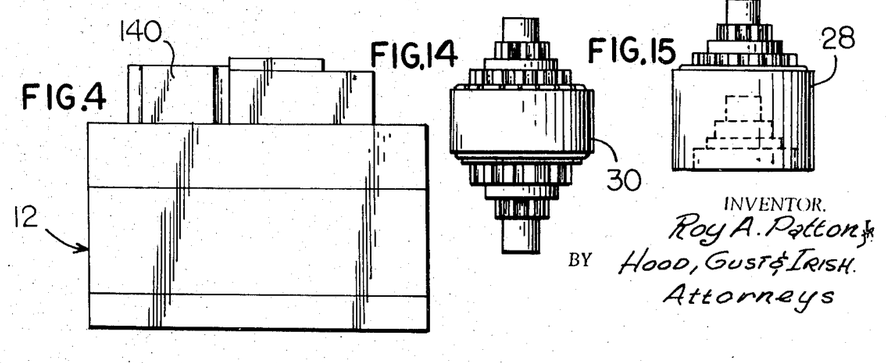
FIG. 4 is a side view (looking at the right-hand side of the mold section of FIG. 3) of the lower mold section.
FIG. 14 is a side view of the male connector body of the molded part of FIGS. 12 and 13 following removal of the sprues and gates therefrom.
FIG. 15 is the female connector body resulting after removal of the sprues and gates.

For an understanding of the cavity shape responsible for the article of FIG. 12, it should be noted that the article of FIG. 12 includes two different connector bodies, one a socket and the other a plug. By stripping the sprues and gates off these bodies, two parts as shown in FIGS. 14 and 15 will be provided. Thus, the mold sections as shown in FIGS. 1 through 4 have two different cavities therein, one being for the plug or male part of FIG. 14 and the other for the socket or female part of FIG. 15. As shown in FIGS. 1, 2 and 3, the cavity for making the female part of FIG. 15 is indicated by the numerals 18, 20 and 22. The cavity for forming the male part of FIG. 14 is indicated by the numerals 18a, 20a and 22a, the numeral 18a indicating the total cavity when the two mold sections 10 and 12 are closed and the two numerals 20a and 22a indicating the portions of the cavity formed in the two mold sections 10 and 12, respectively. The cavity portions 20 and 20a in the upper mold section 10 are shown more clearly in FIG. 5 and the cavity portions 22 and 22a in the lower mold section 12 are shown in FIG. 3. The male and female parts formed in the cavities 18 and 18a are indicated in FIGS. 1, 13, 14 and 15 by the numerals 28 and 30, respectively.

Figures 9, 10, 11:
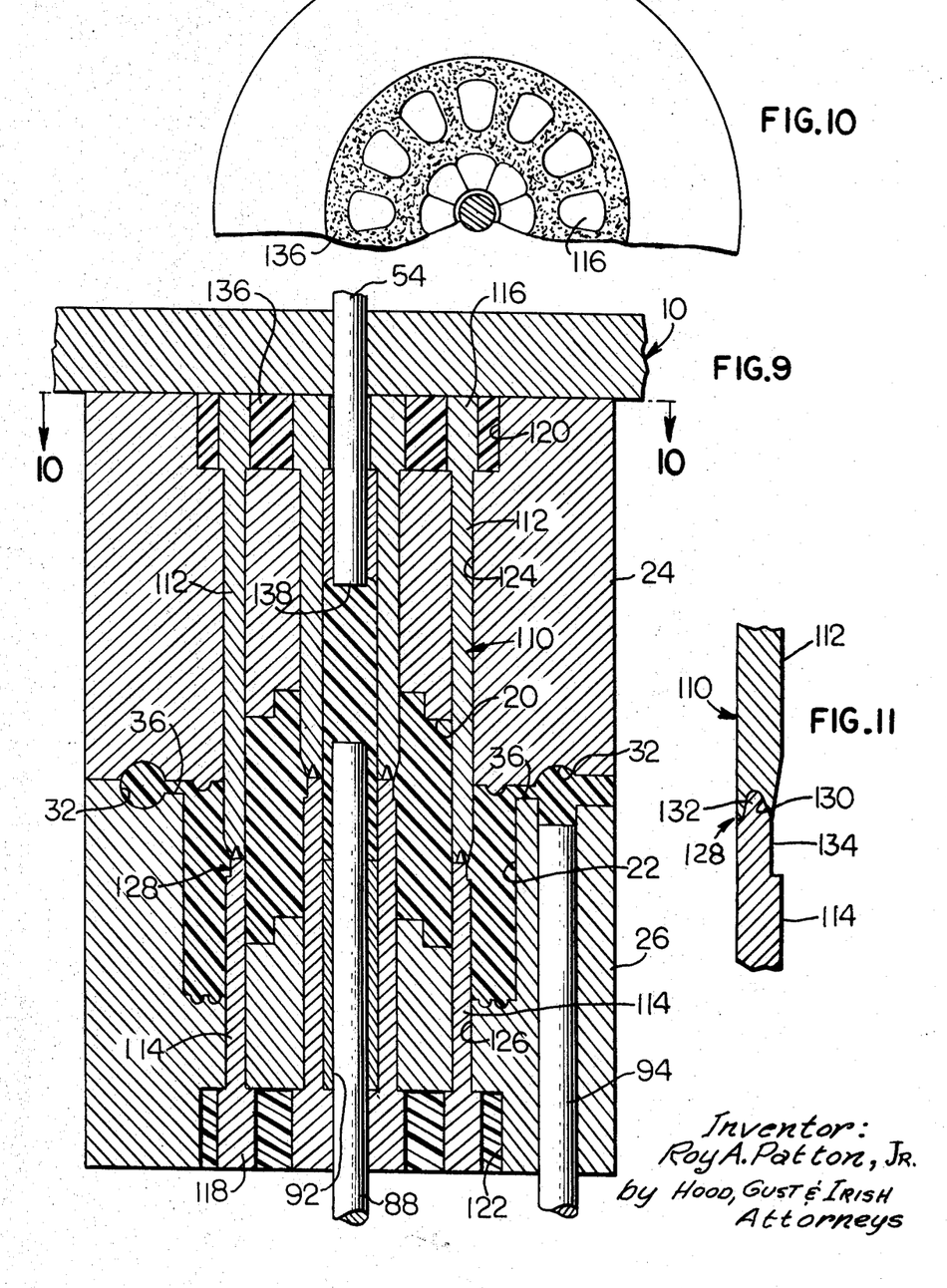
FIG. 9 is a longitudinal sectional view of the cavity inserts closed and forming a mold cavity therebetween.
FIG. 10 is a partial end view of one of the mold inserts of FIG. 9 showing the circular arrangement of the mold pins therein.
FIG. 11 is a fragmentary view, in longitudinal section, of two pin elements abutted in end-to-end relation to provide a core-pin assembly, this same core-pin assembly being shown in FIGS. 9 and 10.

Each of the cavities 18 and 18a, which are substantially cylindrical in shape, are coaxially surrounded by ring-shaped gates 32 and 34, respectively, half of the gate being formed in the upper mold section 10 and the remaining half in the lower section 12. This is more clearly shown in FIG. 9. Between each ring gate 32, 34 and the respective cavity, such as cavity 22 as shown in FIG. 9, is provided an annular sprue 36 which is generally flat and opens around its inner and outer peripheries into the respective cavity and gate. Both the gate 32 and the sprue 36 as well as the gate 34 and its sprue are located substantially midway between the ends of the respective cavity such that the finished parts as taken from the mold will appear substantially as shown in FIG. 13, the gate and sprue portions of this article being indicated by the numerals 32a, 34a and 36a, respectively.

Figure 13:
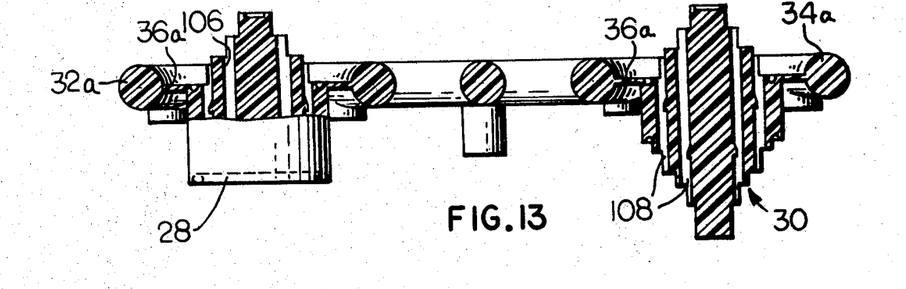
FIG. 13 is a view of the same plastic part partially sectioned for clarity of illustration.

As observed in FIGS. 3, 9 and 13, the gates 32, 34 and the respective sprues 36 coaxially surround the respective cavities 28 and 30 with the plane of the sprues 36 being substantially perpendicular to the cavity axes. Further, the sprues 36 connect to the cavities at one end of the largest diameter portions thereof.

Figures 5, 6, 8:
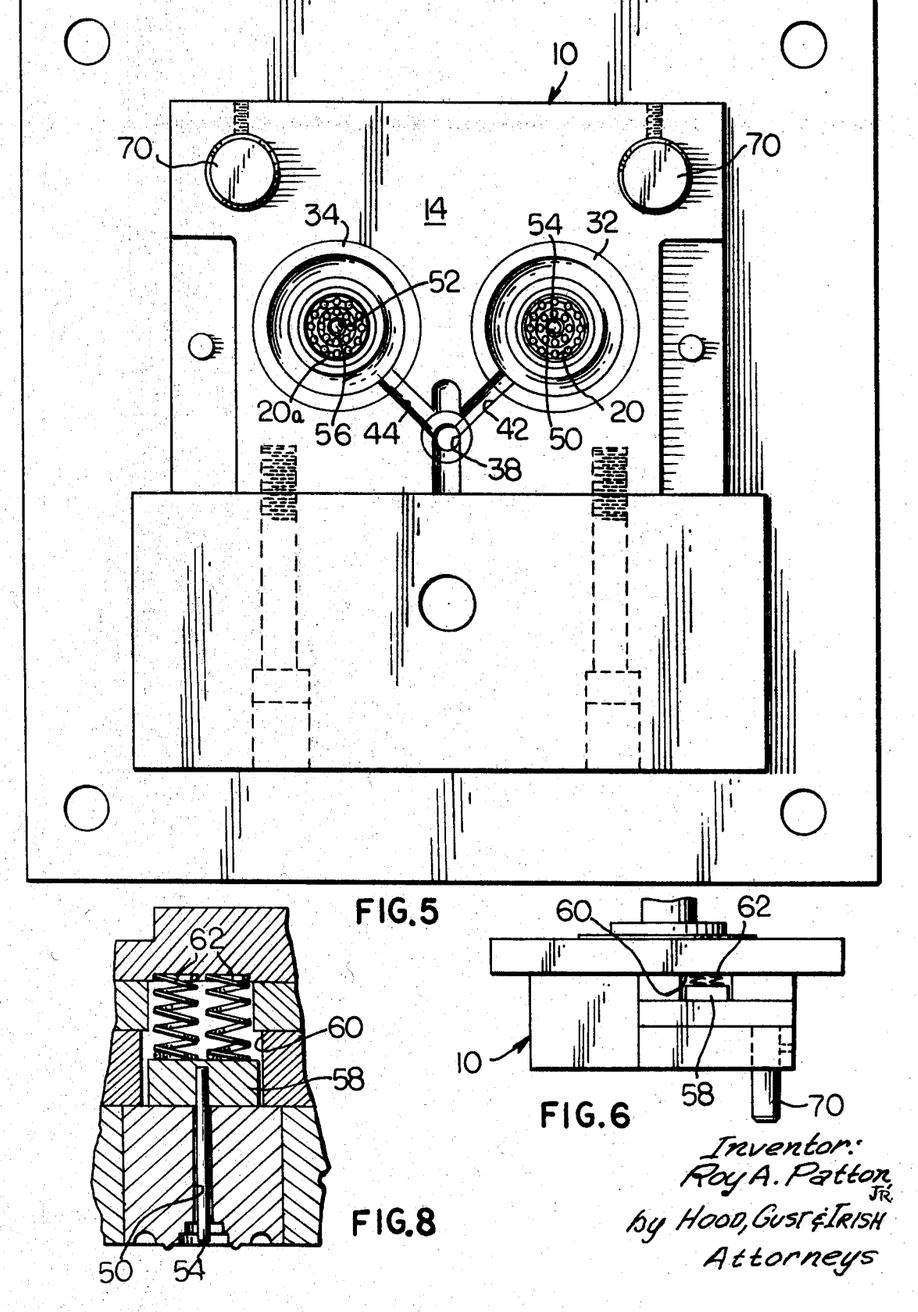
FIG. 5 is a bottom plan view of the upper mold section shown in FIGS. 1 and 2.
FIG. 6 is a view of the side of the upper mold section as seen from the left-hand side of FIG. 5.
FIG. 8 is a fragmentary sectional view taken substantially along section line 8—8 of FIG. 1.

A main injection sprue 38 extends vertically through the upper mold section 10 as shown more clearly in FIGS. 1, 2 and 5, this forming the sprue part 40 as shown in FIG. 12. Sprue branches 42 and 44 extend from the bottom of the main sprue 38 to the ring gates 32 and 34, respectively, as shown more clearly in FIGS. 3 and 5, these branches forming the sprue parts 46 and 48, respectively, of FIG. 12. The main injection sprue 38 opens through the top of the mold section 10, where plastic material, usually in melted form, is introduced under heat and pressure.

Both of the cavity portions 20 and 20a in the upper mold section 10 are centrally vented by means of vertical passages 50 and 52, respectively, these passages receiving for reciprocation venting pins 54 and 56, respectively, attached at the upper ends thereof to a vertically movable plate 58. The venting passages 50 and 52 coaxially extend from the respective cavity portions, and the pins 54 and 56 are of such length that they just enter these cavity portions when the biasing plate 58 is in its lowermost position as shown in FIGS. 1, 6 and 8. The plate 58 is disposed in a recess 60 in the upper mold section 10 for vertical movement and is biased downwardly by means of helical compression springs 62. The venting pins 54 and 56 are made to a size substantially the same as that of the respective passages 50 and 52, normal sliding clearance being adequate to vent the gas trapped inside the cavity.

To insure upward movement of the plate 58, two pins 64 are fastened to the opposite ends thereof as shown more clearly in FIG. 1 which project into stepped recesses 66 formed in the underside of the upper mold section 10 as shown. The lower mold section 12 has two abutment blocks fastened to the upper surface 16 thereof in alignment with the stepped recesses 66 such that when the upper section 10 is lowered onto the lower section 12, the ends of the pins 64 will engage the blocks 68 and elevate the plate 58. Venting pins 54 and 56 are thereby retracted sufficiently to permit gas to escape through the venting apertures 50 and 52, the lower ends of these pins forming the end extremities of the respective cavities.

Secured to and depending from the mold section 10 are two guide pins 70 which are received by two bores 72 in the lower section 12 (FIGS. 3 and 5). The pins 70 and bores 72 are so positioned and sized when they are fitted together, the mold sections 10 and 12 will be registered perfectly to form the mold cavities 18 and 18a, the associated gates, and sprues.

The lower mold section 12 will now be described in detail. This section includes a stationary base plate 74 (see FIGS. 2 and 7) on which are mounted two upright guide plates which are spaced apart and carry on the upper ends thereof a stationary mold base 78. In the facing sides of the guide plate 76 are provided four vertical guide slots 80 which receive for vertical sliding movement lugs 82 on a flat ejector plate 84.

Mounted on top of the mold base 78 is a cavity plate 86 adapted to receive and mount rigidly in recess 27 the cavity insert 26 already described in connection with FIG. 9. If preferred, the cavity 18 may be formed in the plate 86 itself.

Standing upright and secured at the lower ends to the ejector plate 84 are two relatively long pins 88 and 90 which coaxially project into the cavity portions 22 and 22a as shown (see FIG. 2). The upper end of the pin 88 actually forms a part of the cavity shape, whereas the pin 90 serves in cooperation with other pins in connection with ejecting the molded part from the mold after the molding operation is completed. The pin 88 passes through an aperture 92 (see FIG. 9) in the mold insert 26 with a close, sliding fit such that during the molding operation no plastic can escape between the pin and the passage.

Several ejector pins 94 and 96, also upright, are fastened at one end to the ejector plate 84 as shown. These pins 94 and 96 are guided vertically by means of passages 98 and 100 in the mold base 78 and penetrate in close fitting relation the mold inserts, such as insert 26 in FIG. 9, to engage the underside of the ring gates 32a and 34a when a molding operation is completed. With the mold sections closed as shown in FIG. 2, the upper ends of the ejector pins 94 and 96 are disposed just beneath the ring gates 32 and 34. By lifting the upper mold section 10 to the position shown in FIG. 1 and simultaneously therewith lifting the ejector plate 84, the pins 94 and 96 will also be raised, thereby lifting the molded part out of the lower cavity portions 22 and 22a to the position shown in FIG. 1. Four such pins 94 are used in conjunction with the cavity 18 and four pins 96 are used with the cavity 18a. Suitable helical compression springs 102 are interposed between the mold base 78 and the ejector plate 84 for retracting the latter to its lowermost position against the base plate 74. In this position, the upper ends of the ejector pins 94 and 96 are disposed immediately beneath the gate in the lower mold section 12.

Any suitable means may be used for elevating the ejector plate 84 following opening of the upper mold section 10, one suitable means being indicated as a ram 104 which passes through a suitable opening in the base plate 74 for engagement with the underside of the ejector plate 84. Upon elevating the ram 104, the ejector plate 84 will be moved therewith.

As shown in FIGS. 12 and 13, the molded parts 28 and 30 are provided with a series of passages 106 and 108. These passages are adapted to receive connector pins which serve as contactors when the male and female connector parts are fitted together (all as disclosed in said Patton application Ser. No. 611,599). For forming these passages 106 and 108, core-pin assemblies in the cavities 22 and 22a are provided. These core-pin assemblies are shown more clearly in FIGS. 9, 10 and 11. A descripiton of one assembly will suffice for all. One core-pin assembly 110 is composed of two pin elements 112 and 114 abutted end-to-end to form straight extensions of each other. Both of the pin elements 112 and 114 are provided with enlarged heads 116 and 118 which are received in recesses 120 and 122 in the cavity inserts 24 and 26, respectively. Both of these cavity inserts 24 and 26 are provided with bores 124 and 126 which receive in close fitting relationship the two pins 112 and 114 as shown. The bores and pins are so arranged that they extend substantially parallel to the axis of the cavity 22. Also, they span the cavity from end to end as shown.

The abutting ends, indicated generally by the numeral 128 of the two pins 124 and 126 are located substantially midway between the opposite ends of the cavity 22 as shown. The end of the pin 112 is formed with a tapered socket 130 as shown more clearly in FIG. 11, while the upper end of the pin element 114 is provided with a tapered tip 132. The socket 130 and the tip 132 are so sized that they fit intimately when engaged as shown in FIG. 11 so as to prevent any relative lateral movement between the pin elements 112 and 114. When the pin elements are engaged as shown in FIG. 11, a cutout portion 134 is provided which forms a tapered step inside the passages 106 and 108 in the finished parts as shown in FIG. 13.

The head ends 116 and 118 of the pin elements are rigidly secured within the respective recesses 120 and 122 by suitable material such as epoxy plastic, this being indicated by numeral 136 in FIGS. 9 and 10. Thus, the pins 124 and 126 are rigidly secured within the respective inserts 24 and 26 and will move therewith as the mold sections 10 and 12 are opened and closed.

The mold sections 10 and 12 are guided for movement with respect to each other as previously explained, and the pin elements 124 and 126 are so positioned that upon closure of the two mold sections 10 and 12 the inner ends of the pin elements will engage with the tips 132 entering the respective sockets 130. Should there be any slight misalignment between the pin elements 112 and 114 as they engage, each tapered tip 132 in its socket 130 will align the two pins 112 and 114 perfectly so as to provide a straight pin assembly.

As shown more clearly in FIGS. 9 and 10, there are a plurality of these core-pin assemblies arranged in two coaxial circles, these core-pin assemblies being responsible for the passages 106 and 108 in the finished parts as shown in FIG. 13.

The operation of the apparatus is explained in the following. With the cavities 18 and 18a empty and the mold sections 10 and 12 closed to the position illustrated in FIG. 2, molten plastic is introduced into the injection sprue 38 at the head 39 thereof. Molten plastic flows vertically downwardly into the branch sprues 42 and 44 and into the ring gates 32 and 34. From the ring gates, the plastic flows through the annular sprues 36 and 37 and into the respective cavities 22 and 22a. The cavities fill with molten plastic, the latter encircling the core-pin assemblies 112, 114. As the molten plastic is driven toward the centers of the cavities 22, 22a, there is a tendency for air to be trapped in the center portion 138 (see FIG. 9) adjacent to the tip of the venting pin 54. By reason of the clearance between this pin and the opening 50 in the cavity insert 24, this gas escapes.

As the plastic cools and hardens, it tends to shrink inwardly. However, by means of the continued application of liquid plastic into the injection sprue 38, any shrinkage from the walls of the cavity 22 will tend to leave a gap which is immediately filled with plastic from the gate 32. Inasmuch as this process is continuous until the part within the cavity 22, 22a is completely hardened, the entire cavity will be filled to the maximum dimensions thereof.

Conventional apparatus and techniques are used for introducing the molten plastic into the injection sprue 38, the plastic usually being injected under heat and pressure. It should be noted at this point that the present apparatus is disclosed in connection with the process of injection molding. However, as will be explained in some detail later on, the same apparatus disclosed can be used in conjunction with transfer molding by merely replacing the injection sprue 38 with a transfer cylinder.

When the material in the cavities has suitably hardened, the upper mold section 10 is withdrawn upwardly to the position shown in FIG. 1. Simultaneously, the ejector plate 84 is moved upwardly, thereby engaging the upper ends of the ejector pins 94 and 96 with the ring gate portions of the molded article. The latter is then elevated to the position shown in FIG. 1, where it manually may be picked off the ends of the ejector pins. The article will appear as shown in FIGS. 12 and 13. The ring gates and sprues may be broken off the main bodies 28 and 30 (FIGS. 12 and 13), thereby leaving the parts of FIGS. 14 and 15.

For the next molding operation, the ejector plate 84 is retracted to its lowermost position under the force of the springs 102, withdrawing the ejector pins 94 and 96 to a position just beneath the ring gates 32 and 34. The upper mold section 10 is then lowered, these two sections 10 and 12 being guided perfectly with respect to each other by reason of the pins 70 entering the guiding bores 72.

For adapting the apparatus just described for transfer molding, a block 140 (FIGS. 3 and 4) having a cylindrical bore 142 shown in phantom has the lower end thereof connected by means of a sprue branch 144 to the two branches 42 and 44. Plastic material placed in the cylinder 142 is melted under heat and pressure and forced through the various sprues into the cavities as previously explained.

By reason of the ring-gating concept, the present invention is capable of being used in connection with different plastics having widely differing shrinkage ratios. Such ratios may vary from .003 inch per inch to .060 inch per inch. Regardless of the type of plastic used, as it enters the cavity from the ring gate, it flows around the pins and fills the cavity completely. As the plastic cools and shrinkage occurs, spaces within the cavity which would normally occur are immediately filled, inasmuch as the plastic is continuously being injected into the cavity under pressure. Thus, once the plastic is completely hardened, it will have the shape and size of the cavity itself. Shrinkage factors will therefore be of little consequence in connection with obtaining precision molded parts.

The ring gate concept also permits the use of a single mold construction for either injection or transfer molding. Only the molding sprue needs to be changed to adapt the apparatus to either one of these molding techniques. When injection molding is used, the arrangement of FIGS. 1 through 3 as earlier described may be used. If transfer molding is to be used, instead of using the sprue 38, a transfer cylinder 142 and sprue 144 are used.

The passages 106 and 108 (FIG. 13) previously described are molded with precision by reason of the design of the core-pin assemblies 112, 114 previously described. These mold-pin assemblies are disposed inside the mold cavities for forming the multiplicity of coaxially arranged, longitudinally extending passages in the finished part. The pin elements 112, 114 are anchored at the opposite ends thereof in two different mold sections 10 and 12, respectively, with the innermost ends of the pin elements engaging each other in a perfect center joint (the tip 132 and the socket 130). As the mold sections 10 and 12 are operated to closed position, the inner ends of the pin elements 112 and 114 engage and become locked together, thereby preventing any relative movement therebetween. Thus, the core-pin assembly becomes as solid as if it were an integral pin anchored at its opposite ends in the mold sections.

By locating the sprue 36 about midway between the ends of the respective cavity 22, 22a, not only does the liquid plastic flow radially inwardly, but also axially therefrom. Thus, it is possible to fill completely the cavity from a central position which assures the forming of precision parts.

Inasmuch as the sprues 36a (see FIG. 13) are disposed adjacent to one end of the connector body, it is possible to use the sprue 36a as a flange to which hardware may be attached. If the sprue portion 36a is to be left intact, only the gate portion 32a is severed in the final fabrication of the connector parts.

With respect to the core-pin assemblies, the concept of securely anchoring all pins in each mold section provides the strength necessary to withstand the melt pressures without pin distortion during the molding process. In the case of thermosetting plastics, molding is performed at pressures starting at 10,000 p.s.i. upwardly to 50,000 p.s.i. By holding the pin securely and also feeding the plastic into the cavities circumferentially, plastic is flowed around the pin assemblies evenly so as to minimize the application of lateral forces thereto. The result is that distortion of the pins is virtually eliminated, such that all of the passages 106, 108 formed in the finished connector bodies 28 and 30 are precision formed.

If it is desired to alter the shape of the cavities 22, 22a, different cavity inserts 24, 26 having different cavity shapes therein may be inserted into the various mold plates, another cavity insert 26 being inserted into the recess 27, for example, in the cavity plate 86 (FIG. 7).

This invention is particularly noteworthy for its capability of molding with extreme preciseness miniature and microminiature articles, the connector bodies described hereinbefore being an example thereof.

While there have been described above the principles of this invention in connection with specific apparatus, it is to be clearly understood that this description is made only by way of example and not as a limitation to the scope of the invention.

What is claimed is:

1. In a molding apparatus, a die having a mold cavity therein, said die including two mold sections selectively movable into and out of closing engagement with each other, said mold sections having parting surfaces which are sealingly engageable with each other, said mold cavity being defined by two cavity portions in said parting surfaces, respectively, said cavity having opposite ends, one end being in one cavity portion and the other end being in the other cavity portion, mating gates in each of said parting surfaces encircling the cavity portion therein, and sprue means encircling the cavity portion in one of said parting surfaces for feeding molten material into said cavity around the periphery thereof, said sprue means connecting said cavity with the respective gate, said sprue means having an annular passage which connects the respective gate to said cavity, said cavity being generally cylindrical in shape, said gates and said sprue means being generally circular and coaxial with said cavity, said annular passage being generally flat and having a circular orifice opening into said cavity, said orifice being located between said opposite ends, means for permitting the escape of gas from said cavity through at least one end thereof, a straight elongated core-pin assembly in said cavity, said core-pin assembly including two elongated pin elements which are engageable in end-to-end relation, the opposite ends, respectively, of said pin elements being fixedly secured to the opposite ends of said cavity, said core-pin assembly having an axis extending in spaced-parallel relationship to the axis of said cavity, said pin elements being of a length such that the engaged ends thereof are disposed within said cavity.

2. The apparatus of claim 1 in which the engaged ends of said pin elements are provided with a mating tip and socket connection which secures the engaged ends against movement laterally of each other.

3. The apparatus of claim 2 in which there are a multiplicity of said core-pin assemblies coaxially arranged within said cavity, each said tip including a reduced portion on the respective pin element, each said socket including a recess which receives snugly the respective tip thereby preventing relative lateral movement between the engaged pin elements.

4. In a molding apparatus, a die having a generally cylindrical mold cavity therein, said die including two mold sections selectively movable into and out of closing engagement with each other, said mold sections having parting surfaces which are sealingly engageable with each other, said mold cavity being defined by two cavity portions in said parting surfaces, respectively, said cavity having opposite ends, one end being in one cavity portion and the other end being in the other cavity portion, said parting surfaces having therein two annular grooves coaxially encircling the respective cavity portions to form a circular gate when said mold sections are closed, said gate being circular in cross-section, a flat annular sprue coaxially surrounding said cavity connecting said gate with said cavity between the ends of the latter, said sprue extending at substantially right angles to the axis of said cavity, a plurality of straight elongated core-pin assemblies in said cavity, the opposite ends of said core-pin assemblies being fixedly secured, respectively, to the opposite ends of said cavity, each said core-pin assembly including two pin elements which extend into said cavity and have engageable end portions which prevent relative lateral movement therebetween, said engageable end portions including a tapered socket in the end of one pin element and a reduced diameter tapered tip on the end of the other pin element, the tapered tip and socket being intimately engageable for preventing relative lateral motion between the pin elements, two coaxial passages in said cavity ends, respectively, a gas release pin reciprocably received by one of said two passages, and spring means biasing said gas-release pin inwardly toward said cavity.

5. The apparatus of claim 4 in which said core-pin assemblies extend parallel to the axis of said cavity, said core-pin assemblies being arranged coaxially within said cavity.

6. The apparatus of claim 5 in which said pin elements extend into said cavity a distance approximately midway between the opposite ends thereof.

References Cited

UNITED STATES PATENTS

| | | | |
|---|---|---|---|
| 1,748,250 | 2/1930 | Spang | 18—45M |
| 2,378,586 | 6/1945 | Schultz | 18—Vent dig. |
| 2,380,042 | 7/1945 | Hauton | 18—36UX |
| 2,799,435 | 7/1957 | Abplanalp | 18—42DX |
| 2,865,052 | 12/1958 | Wilcox | 18—Vent dig. |
| 2,878,517 | 3/1959 | Cramer | 249—107 |
| 2,890,487 | 6/1959 | Morin | 18—42D |
| 2,890,490 | 6/1959 | Morin | 18—42DX |
| 3,145,423 | 8/1964 | Horvereid | 18—Vent dig. |
| 3,226,771 | 1/1966 | Szugda | 18—42D |
| 3,343,222 | 9/1967 | Kacalieff | 18—42D |

OTHER REFERENCES

Modern Plastics Encyclopedia of 1966, copyright September 1965, pp. 725–726.

J. HOWARD FLINT, JR., Primary Examiner

U.S. Cl. X.R.

18—Vent dig., 45; 249—107, 145, 184; 264—328